(12) United States Patent
Bernstein et al.

(10) Patent No.: US 10,049,334 B2
(45) Date of Patent: Aug. 14, 2018

(54) PROVIDING SUPPORT TO HUMAN DECISION MAKING

(71) Applicant: INTERNATIONAL BUSINESS MACHINES CORPORATION, Armonk, NY (US)

(72) Inventors: Yaniv Shmuel Bernstein, Victoria (AU); Rahil Garnavi, Melbourne (AU); Juerg Von Kaenel, Mahopac, NY (US); Kent Charles Barton Steer, Brunswick (AU); Xingzhi Sun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

(21) Appl. No.: 14/187,718

(22) Filed: Feb. 24, 2014

(65) Prior Publication Data
US 2015/0242787 A1    Aug. 27, 2015

(51) Int. Cl.
G06Q 10/00 (2012.01)
G06Q 20/00 (2012.01)
G06Q 10/06 (2012.01)

(52) U.S. Cl.
CPC .............................. G06Q 10/06316 (2013.01)

(58) Field of Classification Search
USPC ................................................ 705/7.11–7.42
See application file for complete search history.

(56) References Cited

U.S. PATENT DOCUMENTS

| 6,493,637 | B1* | 12/2002 | Steeg ................... G06F 17/2715 |
| | | | 702/19 |
| 6,654,761 | B2* | 11/2003 | Tenev ................ G06F 17/30958 |
| 6,721,719 | B1* | 4/2004  | Aggarwal .............. G06N 5/025 |
| | | | 706/20 |
| 2004/0249644 | A1 | 12/2004 | Schiefer et al. |
| 2005/0096950 | A1* | 5/2005 | Caplan ............. G06Q 10/06314 |
| | | | 705/7.24 |
| 2005/0246215 | A1* | 11/2005 | Rackham ............... G06Q 10/06 |
| | | | 705/7.11 |

(Continued)

FOREIGN PATENT DOCUMENTS

CA    2626172 A1    11/2009

OTHER PUBLICATIONS

Todd, et al., "An Experimental Investigation of the Impact of Computer Based Decision Aids on Decision Making Strategies", The Institute of Management Sciences, Jun. 1991, pp. 87-115 (Year: 1991).*

(Continued)

*Primary Examiner* — Amber A Misiaszek
(74) *Attorney, Agent, or Firm* — F. Chau & Associates, LLC (57) ABSTRACT

A method to provide an insight to a decision maker to assist them in deciding how to perform a task includes: determining a time constraint in which the task needs to be performed; adjusting an accuracy of a computer program designed to calculate the insight to ensure that the insight is generated within the time constraint; scheduling execution of the computer program; and providing an insight output by the executed computer program to the decision maker.

15 Claims, 6 Drawing Sheets

(56) References Cited

U.S. PATENT DOCUMENTS

2007/0023515 A1* 2/2007 Urken .................... G06Q 10/10
235/386
2009/0270758 A1 10/2009 Eagleman et al.

OTHER PUBLICATIONS

Spi DST et al.; "Trellis Automata: Characterizations, Speed-Up, Hierarchy, Decision Problems"; An IP.com Prior Art Database Technical Disclosure; http://ip.com/IPCOM/000151828D; Apr. 23, 2007.
Spi DST et al.; "Man-Computer Synergism for Decision Making in the System Design Process"; An IP.com Prior Art Database Technical Disclosure; http://ip.com/IPCOM/000128403D; Sep. 15, 2005.
Li, Q-L. et al.; "Group of Targets Recognition method in Battlefield Based on Cluster Thought"; Computer Engineering, vol. 33, No. 15, pp. 193-195, Aug. 2007.

* cited by examiner

FIG. 1 e1: optimal plan for dispatching the fight rescue resource
e2: future wind condition
e3: future affected area
e4: optimal plan for dispatching evacuation staff
e5: best routes for evacuation

```
if decision_maker.role = "incident commander"
    then insight.content = "complete view of fire spread area";
else if decision_maker.role = "crew onsite"
    then insight.content = "region around decision_maker.location";

if device.connection = "Broadband"
    then insight.form = "video streaming"
else insight.form = "compressed image set"

if decision_maker.language != "English"
    then translate message to decision_maker.language if decision_maker.environment = "noisy"
    then add text message as transcript in audio communication
```

PROVIDING SUPPORT TO HUMAN DECISION MAKING

BACKGROUND

1. Technical Field

The present disclosure relates to proving support to human decision making, and more particularly to timely support of human decision making based on context information.

2. Discussion of Related Art

A decision support system (DSS) is a computer-based information system that supports human decision-making activities. There are five broad DSS categories including: communications-driven, data-driven, document driven, knowledge-driven and model-driven decision support systems.

A communication-driven DSS supports more than one person working on a shared task and examples include integrated tools like Microsoft's NETMEETING or GROOVE.

A data-driven DSS or data-oriented DSS emphasizes access to and manipulation of a time series of internal company data and, sometimes, external data.

A document-driven DSS manages, retrieves, and manipulates unstructured information in a variety of electronic formats.

A knowledge-driven DSS provides specialized problem-solving expertise stored as facts, rules, procedures, or in similar structures.

A model-driven DSS emphasizes access to and manipulation of a statistical, financial, optimization, or simulation model. Model-driven DSS use data and parameters provided by users to assist decision makers in analyzing a situation. They are not necessarily data-intensive.

The global workforce is undergoing a large transformation. The majority of workers are essentially information processors and decision makers, and the quality and timeliness of their decisions will be heavily affected by the quality and timeliness of the information available to them. Moreover, the growth of information in recent years and the increasing number of situations in which important decisions must be made (e.g., natural disasters) demands advances in decision support. Therefore, there is a growing need for a more tailored, contextualized and holistic view of massive data to support decision making.

Context is the auxiliary information that adds meaning to data. This information can be used to customize data processing pipelines or to augment the delivery of insights. The explicit consideration of context in decision support systems is an acknowledgement of the dynamism of decision-making environments, and the associated importance of reducing the number of assumptions that are made at design time.

While data analytics for decision support has been extensively explored in the past, existing systems have not yet reached the point where they can be integrated seamlessly into the human decision making process. Also, existing evidence-based decision support systems do not incorporate the factor of timeliness and context into their evidence-based insight generation procedure.

BRIEF SUMMARY

According to an exemplary embodiment of the invention, a method of providing an insight to a decision maker to assist them in deciding how to perform a task includes: determining a time constraint in which the task needs to be performed; adjusting an accuracy of a computer program designed to calculate the insight to ensure that the insight is generated within the time constraint; scheduling execution of the computer program; and providing an insight output by the executed computer program to the decision maker. The adjusting of the accuracy of the computer program may occur after the execution of the computer program has been scheduled.

According to an exemplary embodiment of the invention, a method of providing insights to a decision maker to assist them in deciding how to perform a plurality of tasks includes: determining dependencies among the tasks and a time constraint in which each task needs to be performed; adjusting an accuracy of computer programs designed to calculate an insight for each task to ensure that the corresponding insight is generated within the corresponding time constraint; scheduling the computer programs to be executed in an order that satisfies the dependencies; and providing insights output by the executed computer programs to the decision maker. The adjusting of the accuracy of the computer programs may occur after the computer programs have been scheduled to be executed.

BRIEF DESCRIPTION OF THE SEVERAL VIEWS OF THE DRAWINGS

Exemplary embodiments of the invention can be understood in more detail from the following descriptions taken in conjunction with the accompanying drawings in which.

DETAILED DESCRIPTION

Embodiments of the present invention relates to methods and/or systems that can support human decision making. An exemplary embodiment of the invention may consist of a decision support system or method of supporting decisions that schedules computing jobs, decision making tasks, and delivers insight to a decision maker so as to minimize the cost which arises when changing the focus of the decision maker's attention. The system and method can provide context aware decision support in a manner that complements the human thought process.

The use of context throughout and the focus on complementing the human thought process improves the ability of a support system to deliver actionable insights and has the potential to greatly enhance the effectiveness of decision support.

A system for supporting human decision making according to an exemplary embodiment of the invention provides the insights or evidence to the decision maker at the right time and in the right form.

In an exemplary embodiment, the system understands and adjusts to a user's context at any time. Examples of the user's context include the priority, role, environment, and current focus of the user. Thus, the system is sensitive to the context of the decision maker.

The system is also configured to make decisions within required time frames (latency-appropriate). For example, if a person tasked with controlling a wild fire needs a prediction on the locations of where the fire will spread to within the next 5 minutes, the computer program used by the system to make this prediction is aware of the time constraint and adjusts its algorithm to produce a prediction within the required time constraint.

In one example, the program includes several routines that can be called to make the prediction, where each takes a different amount of time to compute the estimate with a different level of accuracy. For example, one of the routines could be twice as accurate as a second one of the routines but could also take twice as long as that routine to output its prediction. Thus, the program can perform a tradeoff between accuracy and execution to select the most optical routine so the result can be returned within the required time constraint and with the highest allowable accuracy supported by that time constraint.

In another example, the program is configured to reduce the amount of data it considers to reduce the time it takes to perform its estimate or increase the amount of data it considers to increase the time it takes to perform its estimate, assuming use of the increased amount of considered data increases the accuracy of the prediction.

An estimate can be performed using an iterative routine. For example, the accuracy of the estimate may increase as the number of iterations is increased. Thus, in another example, the program has knowledge of how long each iteration takes, and allows only enough iterations to satisfy the current time constraints. For example, if every 1000 iterations takes 1 minute, the program could stop after 4000 iterations to ensure an estimate is produced within the 5 minute time frame.

In another example, the program can consider different sets or different methods of acquiring data to generate its estimate within the required time frame. For example, if data needed to perform an estimate is available for download in 6 minutes with a high accuracy from a first website, but available for download in 3 minutes with a medium accuracy from a second website in 2 minutes, the program can choose to use the second website to ensure that the 5 minute constraint is met.

The program may also use various combinations of the above provided examples (factors) to ensure that its estimate is produced within the required time frame. The program can perform a cost benefit analysis using each of the available factors to produce the result that is most accurate and most timely. For example, it could be more cost effective to use the most accurate (slowest) algorithm with the data downloaded from the fastest download source, more cost effective to use a greater number of iterations coupled with an algorithm of lesser accuracy, etc. This cost benefit analysis can be performed by applying different weights to each of the factors. For example, if it is more important to use a higher accuracy algorithm than increasing the number of iterations, the accuracy of the algorithm could receive a higher weight than the increase in iterations.

Thus, the program can dynamically tailor its routines to yield the estimate that would have an optimal accuracy within the required time constraint.

In an exemplary embodiment, the system is configured to guide and augment human thinking by delivering evidence at the right time. For example, the system is designed so that it does not keep the decision maker waiting too long for missing evidence and avoids unnecessarily disrupting the decision maker. For example, the system provides evidence to the user to avoid having them swap their thoughts between different tasks where the user will waste time on refocusing (e.g., offers a cognitive load reduction). For example, even though the system is ready with the requested evidence, if the user is at a different stage of decision making, the system can delay providing the requested evidence until the user has reached the corresponding stage. In another example, suppose that 2 types of evidence are required by the user to make a given decision. Even though one of these types is already available, the system can decide to delay its delivery until both are available since it may be confusing for the user to process them in a disjointed manner.

In an exemplary embodiment, the system is proactive about preventing the user from missing important information. For example, certain information may need to be viewed or considered by the decision maker before they make their final decision, or considered within a certain amount of time. The system can provide an alert to the decision maker that this information needs to be considered and an estimate of the amount of time before it will be sent out. If the information has already been sent, the system can determine whether the user has considered the information. For example, the information can be presented to the user in way that requires acknowledgement before other data can be viewed. For example, the information could be presented in a window that is acknowledged by a user selecting a field (e.g., a checkbox, toggle button) in the window, rolling the cursor over the window, etc.

In an exemplary embodiment, an insight adaptation component of the system adapts the presentation of the evidence it generates to the context of the decision maker (adaption in terms of content of insights). For example, if the insight includes a list of locations that are predicted to be engulfed by a wildfire, a first decision maker responsible for managing the entire area (e.g., full authority) could receive the entire list, while a second decision maker assigned to manage a subset of the area (e.g., with lesser authority) could receive only the locations within his area of control so he is not overloaded with non-essential information.

For the above functions, the context of the decision maker (hereinafter referred to as 'context') plays an important role. The content is any information that describes the decision maker and his/her surrounding environment, and may affect his/her decisions. The context can be classified into various categories including: (1) situational, (2) device/interaction, and (3) individual.

Examples of the situational context includes a) physical context, b) activity context, c) social context, d) event based context, e) intention context, and f) regulatory and compliant contexts.

Examples of the physical context include a spatial context such as location/speed/acceleration, a temporal context such as time/date/season, and an environmental context such as temperature/noise level/light level.

Examples of the activity context include reading, running, etc.

Examples of the social context include the people that the decision maker is friends with.

Examples of the intention context are the interests or preferences of the decision maker.

Examples of the regulatory and compliance context include government regulations regarding media/data, enterprise/corporate instructions and requirements, privacy, accessibility, security, etc.

Examples of the device/interaction context include devices, batteries, displays, programs, networks, bandwidth.

For example, if the decision maker is using a display of a particular resolution, the insight can be formatted to match its resolution, if the decision maker is using a device with a certain viewing program, the insight can be formatted so it can be opened by the viewing program, if the bandwidth of the decision maker is low, the insight can be simplified (e.g., large pictorial graphics can be removed), etc.

Examples of the individual context include a) personal data context, b) preferences context, and c) relationship context.

Examples of the personal data context include personal goals, medical conditions, physical abilities, physical abilities, cognitive related (cognitive patterns) abilities, job role skill set, income, education, religion, culture, languages, personality, address, etc.

For example, if the decision maker has poor eyesight the insight can be presented in a large font, if the decision maker is blind the insight can be presented using only audio, etc.

Examples of the preferences context include flight preferences, restaurant preferences, travel preferences, hotel preferences, etc. For example, if the insight is a particular travel route that includes multiple legs, the insight could include only the flights for those legs with the user's preferred airline.

Examples of the relationship context include family role (e.g., head of household, single parent), family context (number of children, whether the user cares for elderly parents, etc.), identity of friends/colleagues of the decision maker, etc.

When considering a set of decisions to be made, it is important to consider the characteristics of the corresponding decision making tasks. These characteristics include 1) the insights or evidence required to make a decision, 2) the time constraint or the deadline by which the deadline needs to be made, 3) the priority of the decision making task, 4) the dependencies between decision-making tasks, 5) the dependencies between insight/evidence required to make decisions, and 6) the level of trust required for the insights/evidence.

Some characteristics of decision making tasks are sensitive to the context of the decision maker. For example, the urgency with which a decision needs to be taken (a type of context) will affect the time horizon for making that decision.

Figure 1:
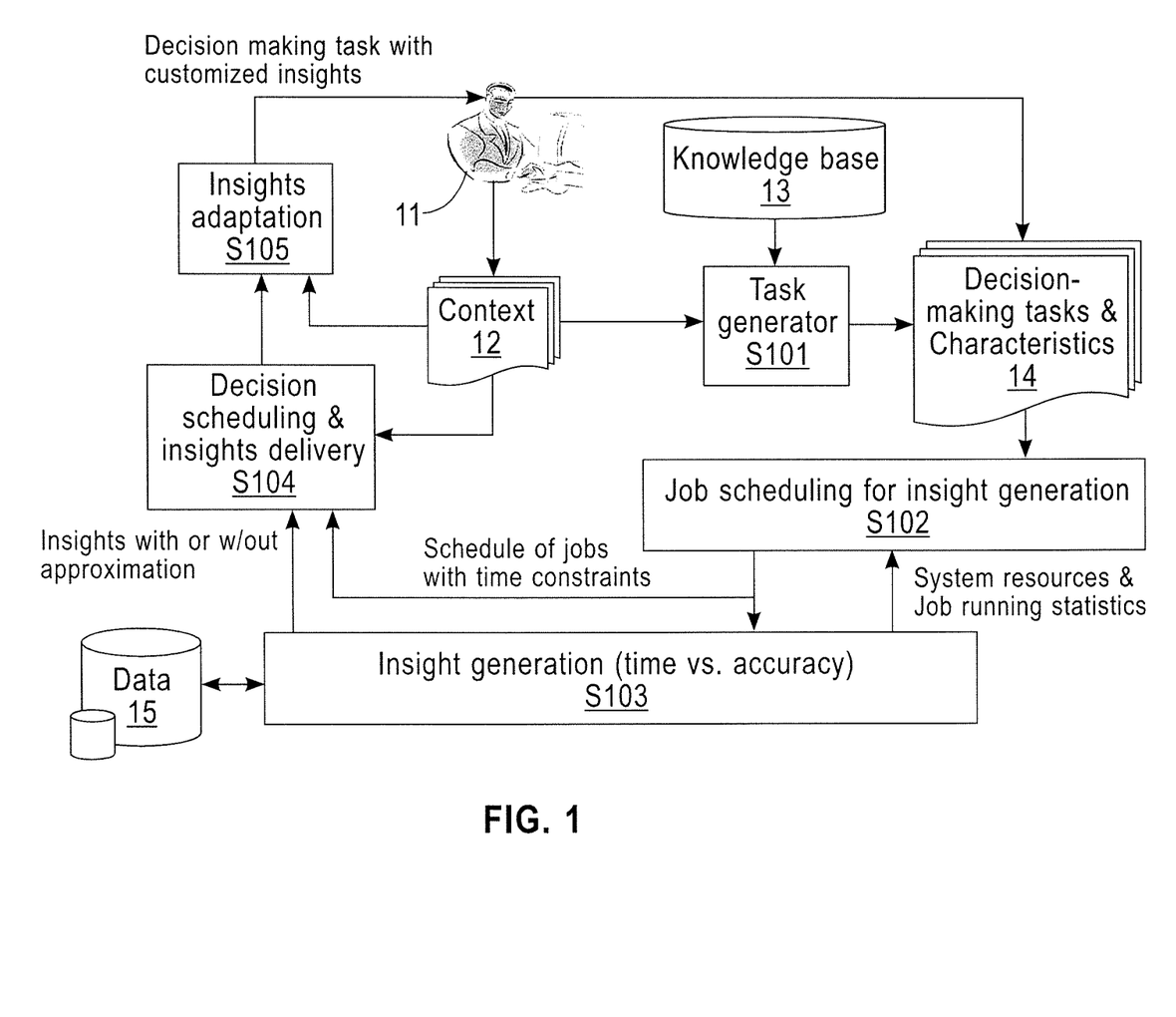
FIG. 1 shows the process flow for an insight generation and delivery system according to an exemplary embodiment of the invention.

FIG. 1 shows the process flow for an insight generation and delivery system according to an exemplary embodiment of the invention. FIG. 1 illustrates a decision maker 11 providing contextual information 12 to the system. As an example, the contextual information may be provided through an electronic questionnaire and/or the contextual information may be mined automatically by the system from available data sources.

The system will be discussed below with respect to a multitasking scenario in which the decision maker is required to make more than one decision. As illustrated in FIG. 1, the system may automatically generate decision making tasks and characteristics 14 based on the contextual information (S101). The system may generate characteristics using information stored in a knowledge base 13. The system can automatically initialize a decision making task based on some predefined knowledge (e.g., pre-defined rules) stored in the knowledge base 13. For example, if an event such as a fire is happening, based on a certain rule in the knowledge base 13, an emergency procedure may be triggered that leads to generation of new decision making task(s). The decision maker 11 may also manually specify the decision-making tasks and characteristics. For example, the system could have a graphical user interface that enables the decision maker 11 to enter the tasks and corresponding characteristics.

In at least one embodiment of the invention, the characteristics include all of the time constraints and the dependencies. For example, the characteristics identify the deadlines for performing each task, if any. Further, the characteristics identify any dependencies that exist among the tasks. For example, if a first one of the tasks needs an output of a second one of the tasks, that first task is dependent on completion of the second task. Thus, based on the characteristics of the decision making tasks (e.g., the time constraints and dependencies), a job scheduling component of the system generates a schedule of jobs (S102), where each generates an insight required for decision making. An example of a job is a computer program, process, or software thread. One or more jobs may be used to provide one or more insights for each task.

The schedule of jobs needs to meet the required timeframe for all decisions (e.g., adjust accuracy, drop unimportant insights, etc.). For example, when the system calls a job, it could pass a parameter to the job that indicates the required time constraint, and the jobs make the appropriate internal adjustments or a wrapper routine passes parameters to the jobs to yield the insights within the required time frames.

The schedule of jobs needs to also prioritize jobs for high-priority decision making tasks. For example, even though adjustments have been made to ensure that two tasks are completed within their required time constraints to offer corresponding insights, if the insight of a first one of these tasks is more important to the decision making process, it would be better to give the first task a higher priority. Thus, the system might schedule the first task to be run before the second task. Further, if several tasks are dependent on the output of a single task, it may be a good idea to schedule that single task to have the highest priority.

The schedule of jobs also attempts to keep the "arrival time" of insights for a single decision-making task within a short interval (e.g., avoid long-waiting period). For example, if the required time constraint for a job producing a given insight for a corresponding decision-making task is 1 hour, but processing the job beyond 30 minutes does not yield statistically improved accuracy, it makes sense to provide the insight produced after 30 minutes rather than allowing the job to use the entire 1 hour time limit.

Next, according to the schedule, an insight generator component of the system executes the jobs (S103). The insight component is able to dynamically alter the tradeoff between accuracy of output and a job's running time. For example, assume it was initially concluded that an hour is the required timeframe for output of the estimated path of a fire, the corresponding job has been processing for only 20 minutes, and the decision maker is now requesting this information within 30 minutes. Thus, the insight component could inform the job of the updated deadline so it can yield the insight based on the new time constraint. Thus, given the new deadline and a job, the system can control the settings for running the job, which can generate approximate answers in the required timeframe (latency-appropriate). The database 15 denotes data sources uses for generating insights. For example, to simulate the spread of a fire, the system needs to use many types of sensor data, which could be stored in database 15, a file system, or in the form of data streams. The knowledge of how the insight generator component should alter the tradeoff may also be stored in a database 15.

A decision scheduling and insight delivery component of the system monitors the context of the decision maker 11 and the status of the job (S104). The monitoring allows the system to suggest the decision that needs to be made at the right time, and delivers insights to the decision maker in way that the insights can naturally fit the human thought process (e.g., cognitive load reduction). For example, the monitoring could be aware that the decision maker 11 is currently in a first stage of a decision making process, and even though the insights for the second stage are already available, these insights would not be provided until the monitoring learns that the decision maker has completed the first stage.

Next an insight adaptation component of the system adapts the insights to the context of the decision maker 11 so that the decision maker can easily consume the insights (S105). For example, in a scenario in which more than one person can make decisions based on a given set of insights, the insights can be personalized and be presented in a tailored form appropriate to each user. For example, if one decision maker is controlling one region, even though insights are available for a larger region encompassing the controlled region, the insight adaptation component can filter out the insights outside the region of control.

Each of the above-described components will be discussed below with respect to an emergency management scenario, and more specifically with respect to a bushfire.

In the present example, a bushfire has been reported in a place five miles away from a town. It is assumed that high wind speeds accelerate the spread of the fire towards the town. In this example, it is assumed that the fire commissioner needs to make a series of decisions to control the fire and protect the safety of nearby residents, all of which are subject to time constraints. It is further assumed that three decisions need to be made, namely "How to control the fire?" D1, "Is evacuation required?" D2, and "If evacuation is needed, what is the optimal plan?" D3.

Figure 2:
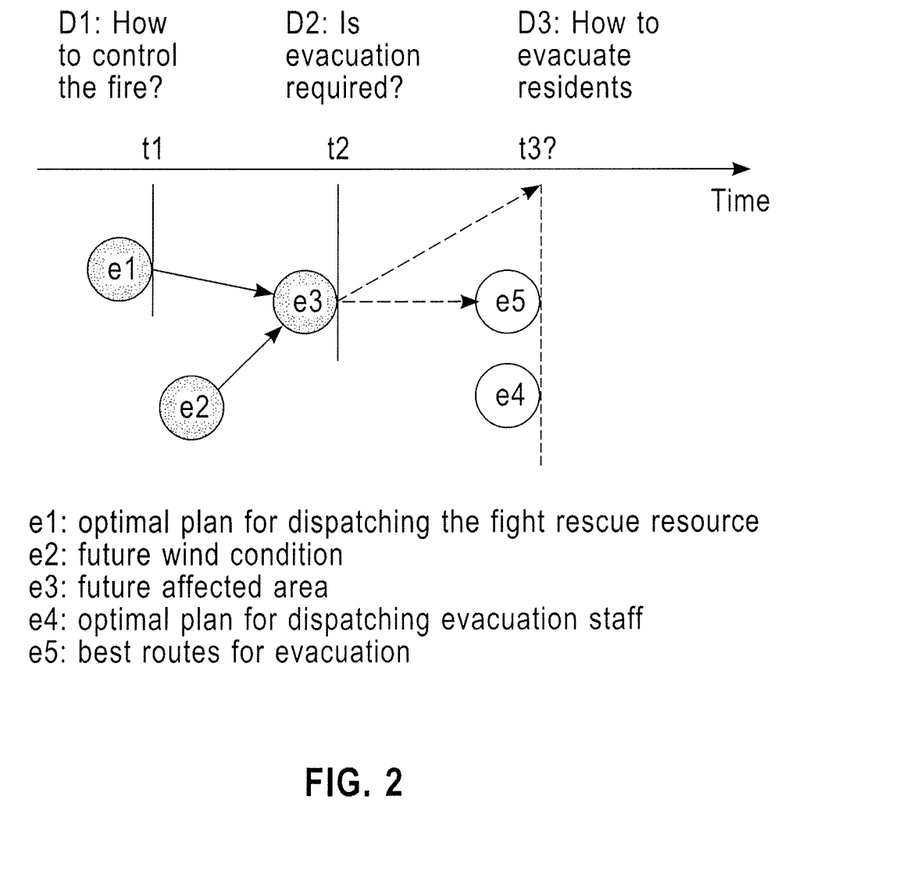
FIG. 2 shows examples of decision making tasks that could be created by the system.

FIG. 2 shows three decision-making tasks D1, D2, and D3 that will be executed to provide evidence/insights required (e.g., e1, e2, e3, e4, e5) for each decision, and their dependencies in the running example.

The first decision-making task D1 provides insights/ evidences useful in determining how to control the fire, such as an optimal plan for dispatching firefighting appliances and personnel e1, which can be produced using a resource optimization job j1.

The second decision-making task D2 provides insights/ evidences useful in determining whether an evacuation is required, such as future wind conditions e2 produced via a weather simulation job j2 and a future fire affected area e3 produced via a fire spread model simulation job j3.

The third decision-making task D3 provides insights/ evidences useful in determining the optimal evacuation plan if an evacuation is required, such as an optimal plan for dispatching evacuation personnel e4 produced via a resource optimization job j4, and optimal routes for evacuation produced via a traffic simulation/prediction job j5.

Referring to FIG. 2, the vertical lines indicate the time constraints for decision making. As shown in FIG. 2, D2 is dependent on D1 because whether or not an evacuation is required depends on how fire suppression efforts are deployed; D3 depends on D2 because D3 is only necessary when the evacuation is made. The time constraint of D3 is also determined by the fire spread situation (e3). The dependencies between pieces of evidence are shown by arrows.

In the above bushfire example, various different types of situation contextual data may be relevant to the decision making such as the location of the event, the time/date of the event, the season, the weather, the current stage of the decision making (e.g., currently making decision D1), the identity of the events (e.g., a bushfire, traffic congestion, etc.), the people involved (e.g., ambulance staff, fire fighters, traffic controller, etc), the goals and preferences (e.g., human lives are more important than properties), and the government regulations for bushfire response.

In the above bushfire example, various different types of device/interaction contextual data may be relevant to the decision making such as the type of devices available (e.g., Video wall+IBM p-server as backend), the Network (e.g., intranet and internet), the Bandwidth (e.g., 16 Mbps).

In the above bushfire example, various difference types of individual contextual data may be relevant such as the role of the decision maker (e.g., incident commander), the preferred media (e.g., visual, audio, text, etc.), the attention span of the decision maker (e.g., Very Good, Medium, Poor, etc.), the languages of the decision maker (e.g., English, Chinese, etc.).

Figure 3:
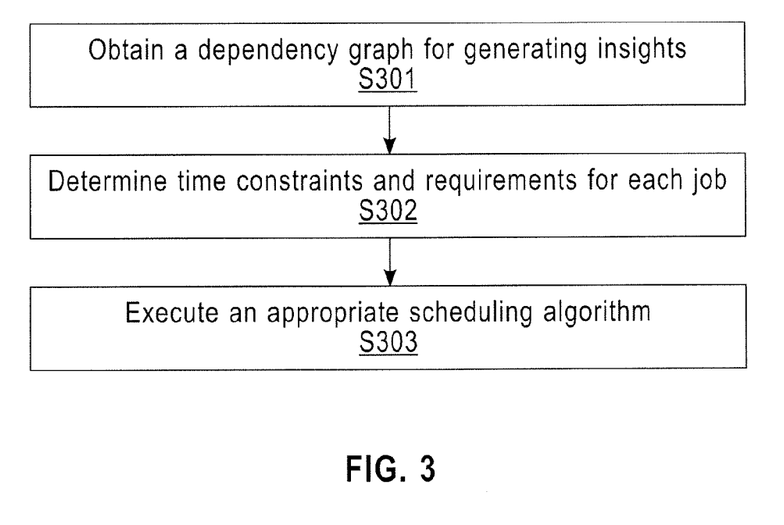
FIG. 3 shows a method performed by a job scheduling component of the system according to an exemplary embodiment of the invention.

The job scheduling component of the system receives an input of decision making tasks and their characteristics 14 and outputs a schedule of insight/evidence generation jobs. FIG. 3 shows a method executed by the job scheduling component based on the inputs according to an exemplary embodiment of the invention. Referring to FIG. 3, the method includes: obtaining a dependency graph for generating the necessary insight(s) (S301), determining the constraints and requirements for each insight generation job (S302), and executing an appropriate scheduling algorithm (S303). The appropriate scheduling algorithm performs the following: 1) selects an appropriate job for generating each insight and 2) has a schedule of the jobs, such that the job schedule can i) meet the required timeframe for all decisions, ii) prioritize jobs for high-priority decision tasks, and iii) keeps the "arrival time" of insights for same decision task within a short interval.

Some insights also should be delivered as a set to reduce the cognitive load on the decision maker. As an example, a decision maker may request a visualization of traffic congestion points (e4) and the path of a fire (e3). The system determines that the traffic congestion data can be obtained via simulation based on the latest vehicle numbers and road blockage data. The fire path requires a wind forecast (e2), initial fire conditions, fire crew deployment strategy (e1), area topology and fuel load. The scheduler might also know that a new weather forecast job is due to complete in the next 10 minutes. It decides to begin the traffic simulation but wait for the weather data before launching the fire path estimation process. Once both are complete a combined graphic is produced for the decision maker.

Figure 4:
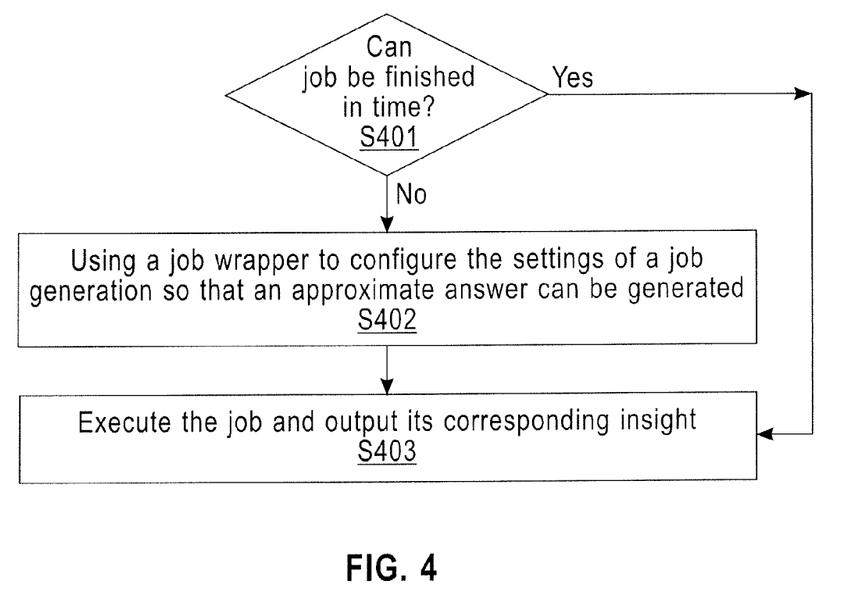
FIG. 4 illustrates a method performed by an insight generation component of the system according to an exemplary embodiment of the invention.

The insight generation component of the system receives an input of an insight generation job, the deadline of the job, and available resources, and provides an output of insights within the provided deadline. FIG. 4 illustrates a method performed by the insight generation component based on the inputs. Referring to FIG. 4, the method includes: evaluating if the job can be finished within the deadline, based on the resources available (S401) and if the job cannot be finished, using a job wrapper to configure the settings of a job generation so that an approximate answer can be produced within the deadline (S402), and executing the job and outputting its corresponding insight (S403).

Settings for approximate computing are job dependent, and may cover categories such as data reduction by sampling, algorithm selection (e.g., select algorithm with appropriate runtime (e.g., optimization based approach vs. heuristic based approach)), algorithm setting (e.g., reduce the number of iterations for early termination, ignore parameters, skip steps that are not absolutely necessary, etc.), insight versioning (e.g., rely on old insight(s) rather than spending time updating insights).

For example, some jobs cannot be executed within the required time interval. For example, the weather simulation for predicting future wind conditions may need more time than is available. The job wrapper can reduce the resolution of the simulation to reduce the runtime period (at the cost of accuracy). Also, fire status extracted from social media is an input for the fire-spread model and complements the data from an emergency report system. Under an extreme emergency situation, the model may ignore this input to save the time spent on event extraction from social media messages and trust verification.

Another example is that when making an evacuation plan, applying predefined rules is much faster than finding an optimal plan via traffic simulation. The selection of these two options depends on the time constraints of the moment.

Figure 5:
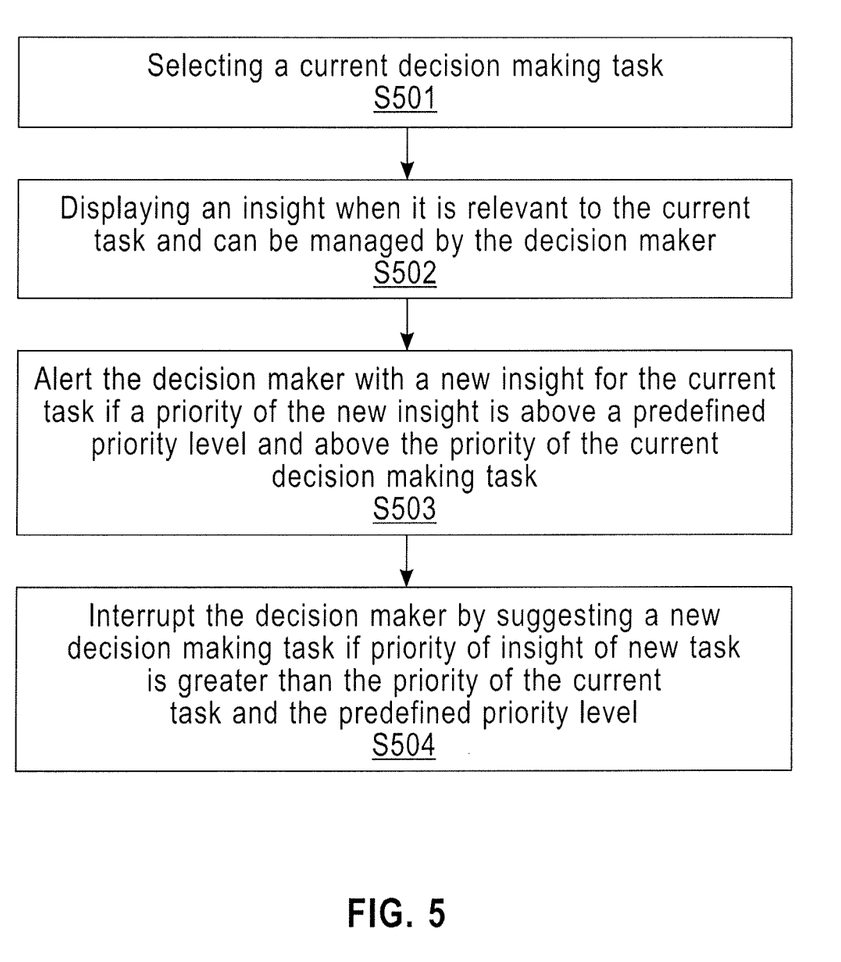
FIG. 5 illustrates a method performed by a decision scheduling and insight delivery component of the system according to an exemplary embodiment of the invention.

The decision scheduling and insight delivery component of the system receives an input of decision making tasks and their characteristics, a job schedule, insights generated, status of jobs, and the context 12 of the decision maker, and provides outputs such as display of the next decision to be made and the insights that need to be considered to make that decision. FIG. 5 illustrates a method performed by the decision scheduling and insight delivery component based on the inputs according to an exemplary embodiment of the invention.

Referring to FIG. 5, the method includes: selecting a current decision-making task T based on dependencies among tasks, insights available, and its relevance to a previously completed task in terms of sharing the same insights (S501), displaying an insight when it is relevant to the current decision-making task, and only if it currently can be managed by the decision maker (e.g., avoid distraction) (S502), alerting the decision maker by popping up a new insight for the current decision-making task if a priority of this insight (e.g., based on the user's context) is above a predefined priority level (S503), and interrupting the decision maker by suggesting a new decision making task T if the priority of the new decision making task T is greater than the priority of current decision-making task T (S504).

For example, if the system is aware that the incident commander has communicated with different agencies, it can infer that the first decision D1 has been made and then the second decision becomes active. Thus, since the wind forecast (e2) is needed for the second decision, it can be displayed to the decision maker 11 whenever it is ready. Also, the status of computing fire spread model (for e3) is shown for giving the user an overview of the second decision-making task D2. After a while, e4 is ready but the system will hold the delivery of e4 until the second decision D2 is made.

Figure 6:
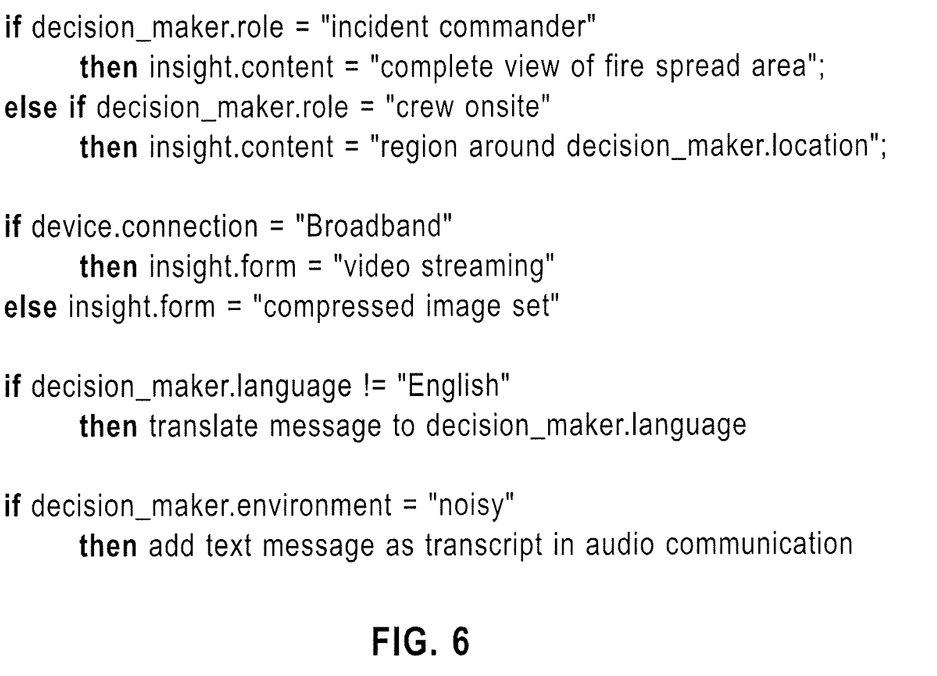
FIG. 6 shows exemplary pseudo code to generate an adapted insight, which may be used by an insights adaption component of the system.

The insight adaptation component of the system receives an input of insights and the context 11 (e.g., situational: what is environment of decision maker? Personal: role, language; Device: device type, internet connection, bandwidth), and provides an output of an adapted or filtered insight. FIG. 6 shows exemplary pseudo code that could be used to generate the adapted insight. For example, the pseudo code varies the view based on whether the decision maker has control of the entire region (e.g., incident commander gets entire view) or has control of a subset of the region (e.g., crew person gets view around location of crew person). Further, the exemplary pseudo code transmits the insight using video streaming if the decision maker has a broadband connection or in a compressed format otherwise. Additionally, the exemplary pseudo code translates the insight to the language of the decision maker. Further, the exemplary pseudo code can supplement the insight when it has knowledge that the environment of the decision maker is particularly noise (e.g., can add a textual transcript to what would otherwise be a purely audio communication).

The task/job generator component of the system receives an input of the context of the decision maker 11 and provides an output such as the system-generated decision-making tasks and their characteristics. The task/job generator component of the system may apply a rule-based algorithm that is triggered by events, to proactively generate insights that may be of use to the decision maker. For example, if via fire simulation, it is reported that a fire is going to reach a chemical factory, by following some pre-defined rule, the system will generate a new decision-making task (e.g., "what is the best action to avoid/reduce this impact?"). As another example, by combining dynamic population data with pre-computed evacuation capacities for low accessibility communities (in terms of the number of roads in and out), emergency management authorities could be alerted dangerous situations before a fire begins.

The insight generation component can let the user know the progress of running jobs. Then the decision maker can have the overview of the status of relevant insights. For example, the decision maker 11 may be interested in the time when the next important insight is available. Or given the current level of accuracy of the insights, the decision maker 11 can decide whether to wait additional time for more accurate insights (run by a different job) which will be ready after X minutes. The current system architecture can support this function. In FIG. 1, the output of the insight generation component is the insights with/without generation. This output can be enriched by adding the status of all insight generation jobs, which means showing the status of uncompleted jobs (i.e., estimated time for the insight to get ready). Then the decision scheduling & insights delivery component can pass the completed insights and the status of uncompleted insights to the decision makers based on their context (e.g., the ones relevant to the current decision making task).

However, the invention is not limited to providing insights for controlling bush fires. For example, the invention can be applied to other emergency situations such as earthquakes, floods, tornadoes, hurricanes, evacuations, police situations (e.g., a manhunt, a shooting, etc.), emergency medical responses, medical treatment, etc. Further, the invention may be applied to non-emergency situations such a financial situation where financial decisions need to be made. For example, these financial decisions could be whether to buy, sell, or hold a stock or bond, and the insights could include financial data that would be helpful in making these decisions. For example, if the price of a stock is dropping and the rate of the drop is accelerating beyond a normal range, this insight should be provided to a trader in a timely fashion.

Figure 7:
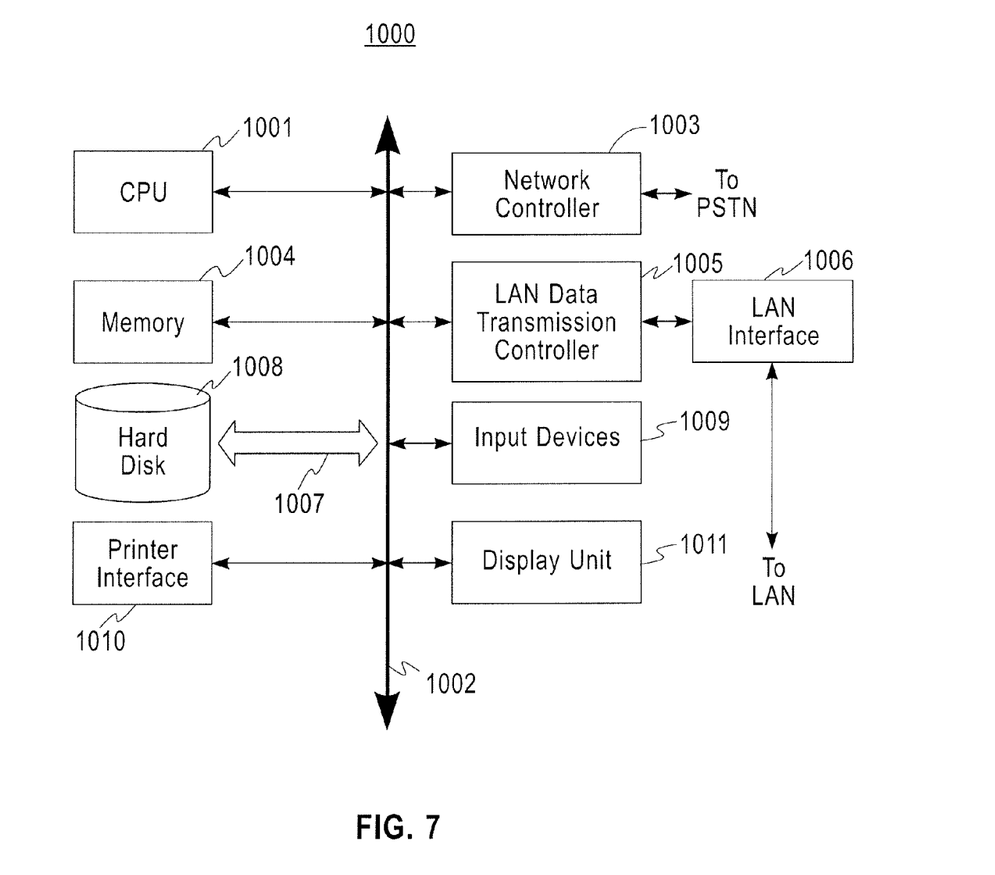
FIG. 7 illustrates an example of a computer system capable of implementing methods and systems according to embodiments of the disclosure.

FIG. 7 illustrates an example of a computer system, which may execute any of the above-described methods, according to exemplary embodiments of the invention. For example, the process flow of FIG. 1 and FIG. 2, the methods of FIGS. 3-5, the pseudo code of FIG. 6 may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

Referring to FIGS. 1-6, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for configuring a computer system to predict a result from data associated with an event, the result usable by a human being in deciding how to perform a task that responds to the event, the method comprising:
    determining, by a first computer program, a time constraint in which the task needs to be performed;
    determining, by the first computer program, whether current settings of a second computer program of the computer system enable the computer system to predict the result from the data within the time constraint;
    directing, by the first computer program, the second computer program to switch from using a first algorithm performing a first number of iterations on the data that completes at a first time with the result of a first accuracy, to using a second algorithm performing a second number of iterations on the data that completes at a second time with the result of a second accuracy when it is determined that the current settings will not cause the computer system to predict the result within the time constraint;
    scheduling, by the first computer program, execution of the second computer program on the computer system to predict and output the result; and
    providing, by the first computer program, the result output by the executed second computer program to the human being,
    where the second number of iterations is lower than the first number of iterations and the second time is shorter than the first time.

2. The method of claim 1, wherein the providing comprises:
    repeatedly determining whether the human being is ready to receive the result; and
    terminating the repetition and providing the result to the human being when it is determined that the human being is ready.

3. The method of claim 1, wherein the determining of the time constraint comprises:
    querying, by the first computer program, the human being to manually enter a time and date; and
    setting, by the first computer program, the time constraint based on the entered time and date.

4. The method of claim 1, where the determining of the time constraint comprises the first computer program automatically inferring the time constraint from contextual data relevant to performing the task and characteristics of the task.

5. The method of claim 1, wherein the providing of the generated insight comprises:
    determining a role of the human being;
    filtering the output result based on the determined role; and
    providing the filtered result to the human being.

6. The method of claim 5, wherein the filtering provides the entire result to the decision maker when the role indicates the human being has full authority and provides only part of the entire result when the role indicates the human being has less than the full authority.

7. A computer system configured to predict a result from data associated with an event, the result usable by a human being in deciding how to perform a task that responds to the event, the system comprising:
    a memory storing a first computer program and a second computer program; and
    a processor configured to execute the first computer program and the second computer program,
    wherein the first computer program determines a time constraint in which the task needs to be performed,
    wherein the first computer program determines whether current settings of the second computer program enable the computer system to predict the result within the time constraint,
    wherein the first computer program directs the second computer program to switch from using a first algorithm performing a first number of iterations on the data that completes at a first time with the result of a first accuracy to using a second algorithm performing a second number of iterations on the data that completes at a second time with the result of a second accuracy when it is determined that the current settings will not cause the computer system to predict the result within the time constraint,
    wherein the first computer program schedules execution of the second computer program on the computer system to predict and output the result, and
    wherein the first computer program provides the output result to the decision maker,
    where the second number of iterations is lower than the first number of iterations and the second time is shorter than the first time.

8. A computer program product to configure a computer system to predict a result from data associated with an event, the result usable by a human being in deciding how to perform a task, the computer program product comprising a computer readable storage medium having program instructions embodied therewith, the program instructions executable by the computer system to perform a method comprising:
    determining, by a first computer program, a time constraint in which the task needs to be performed;
    determining, by the first computer program, whether current settings of a second computer program of the computer system enable the computer system to predict the result within the time constraint;
    directing, by the first computer program, the second computer program to switch from using a first algorithm performing a first number of iterations on the data that completes at a first time with the result of a first accuracy to using a second algorithm performing a second number of iterations on the data that completes at a second time with the result of a second accuracy when it is determined that the current settings will not cause the computer system to predict the result within the time constraint;

scheduling, by the first computer program, execution of the second computer program on the computer system to predict and output the result; and providing, by the first computer program, the result output by the executed second computer program to the human being, where the second number of iterations is lower than the first number of iterations and the second time is shorter than the first time.

9. A method for configuring a computer system to predict a result from a set of data sets associated with an event, the result usable by a human being in deciding how to perform a task, the method comprising:

determining, by a first computer program, a time constraint in which the task needs to be performed;

determining, by the first computer program, whether current settings of a second computer program of the computer system enable the computer system to predict the result within the time constraint;

directing, by the first computer program, the second computer program to switch from using a first algorithm of a first accuracy to a second algorithm of a second accuracy lower than the first accuracy when it is determined that the current settings will not cause the computer system to predict the result within the time constraint;

scheduling, by the first computer program, execution of the second computer program on the computer system to predict and output the result; and providing, by the first computer program, the result output by the executed second computer program to the human being, wherein the first algorithm predicts the result using the entire set of data sets, and the second algorithm predicts the result using only a subset of the entire set that excludes some of the data sets.

10. A computer system configured to predict a result from a set of data sets associated with an event, the result usable by a human being in deciding how to perform a task, the system comprising:

a memory storing a first computer program and a second computer program; and a processor configured to execute the first computer program and the second computer program, wherein the first computer program determines a time constraint in which the task needs to be performed, wherein the first computer program determines whether current settings of the second computer program enable the computer system to predict the result within the time constraint, wherein the first computer program directs the second computer program to switch from using a first algorithm of a first accuracy to using a second algorithm of a second accuracy lower than the first accuracy when it is determined that the current settings will not cause the computer system to predict the result within the time constraint, wherein the first computer program schedules execution of the second computer program on the computer system to predict the result, and wherein the first computer program provides the generated insight to the decision maker, wherein the first algorithm predicts the result using the entire set of data sets, and the second algorithm predicts the result using only a subset of the entire set that excludes some of the data sets.

11. The method of claim 1, wherein the directing comprises creating a job on the computer system based on the second computer program that receives the time constraint as a parameter when executed.

12. The computer system of claim 7, wherein the first computer program directs the second computer program by creating a job on the computer system based on the second computer program that receives the time constraint as a parameter when executed.

13. The computer program product of claim 8, wherein the directing comprises creating a job on the computer system based on the second computer program that receives the time constraint as a parameter when executed.

14. The method of claim 9, wherein the adjusting comprises creating a job based on the second computer program that receives the time constraint as a parameter when executed.

15. The computer system of claim 10, wherein the first computer program directs the second computer program by creating a job based on the second computer program on the computer system that receives the time constraint as a parameter when executed.

* * * * *